United States Patent [19]

Buxbaum et al.

[11] Patent Number: 4,773,938
[45] Date of Patent: Sep. 27, 1988

[54] FINELY DIVIDED ISOMETRIC HEXAFERRITE PIGMENTS WITH A W-STRUCTURE, PROCESSES FOR THEIR PREPARATION AND THEIR USE

[75] Inventors: Gunter Buxbaum; Ulrich Meisen, both of Krefeld; Florian Haberey, Bochum, all of Fed. Rep. of Germany

[73] Assignee: Bayer Aktiengesellschaft, Leverkusen-Bayerwerk, Fed. Rep. of Germany

[21] Appl. No.: 918,574

[22] Filed: Oct. 14, 1986

[30] Foreign Application Priority Data

Oct. 23, 1985 [DE] Fed. Rep. of Germany ....... 3537623

[51] Int. Cl.$^4$ ............................................. C04B 14/00
[52] U.S. Cl. .................... 106/459; 106/418; 106/456; 423/594
[58] Field of Search ...................... 106/290, 304, 309; 423/594

[56] References Cited

U.S. PATENT DOCUMENTS

| | | | |
|---|---|---|---|
| 3,716,630 | 2/1973 | Shirk | 423/594 |
| 4,017,303 | 4/1977 | Koester et al. | 106/304 |
| 4,328,042 | 5/1982 | Ostertag et al. | 106/304 |
| 4,407,721 | 10/1983 | Koike et al. | 423/594 |
| 4,425,250 | 1/1984 | Hibst | 423/594 |
| 4,493,779 | 1/1985 | Kamiyama | 423/594 |
| 4,493,874 | 1/1985 | Kubo et al. | 428/403 |
| 4,631,090 | 12/1986 | Naumann et al. | 106/304 |

OTHER PUBLICATIONS

Ferromagnetic Materials, vol. III, Editor E. P. Wohlfarth, North-Holland Publishing Company, Amsertdam, N.Y., Oxford, (1982), pp. 306–313, 318–325 and 393–399.

Primary Examiner—Paul Lieberman
Assistant Examiner—Willie J. Thompson
Attorney, Agent, or Firm—Connolly and Hutz

[57] ABSTRACT

Finely divided magnetic particles of hexaferrite pigments with a W-structure having the composition $$E_x M_m(I) M_n(II) Fe_{18-(m+n)} O_{27-y} D_y$$

wherein
E is at least one element from the group comprising alkaline earth metals, alkali metals, lanthanides or lead,
M(I) and M(II) are independently at least element from the group comprising metals or semi-metals and
D is at least one element from the group of halogens and chalcogens and
$0.8 \leq x \leq 1.2$,
$1.0 \leq m \leq 3.0$,
$0 \leq n \leq 8.0$,
$0 \leq y \leq 5.0$ and
n is the same as y when $n > 0$
with the proviso that electroneutrality is preserved,
and wherein the hexaferrite pigment particles have substantially the same dimensions in all directions in space are useful in producing magnetic recording media, such as tapes, and are produced by melting a mixture of (i) metal oxides, hydroxides, hydroxyoxides, carbonates, nitrates or mixtures thereof corresponding to the composition of the W-hexaferrite pigments together with (ii) boron oxide, boric acid, metal borates, $SiO_2$ or mixtures thereof at temperatures of from 1100° to 1450° C. and then chilling the melt obtained to $\leq 600°$ C. and then tempering the chilled melt at temperatures of from 1000° to 1400° C. for 1 second to 2 hours.

11 Claims, 1 Drawing Sheet

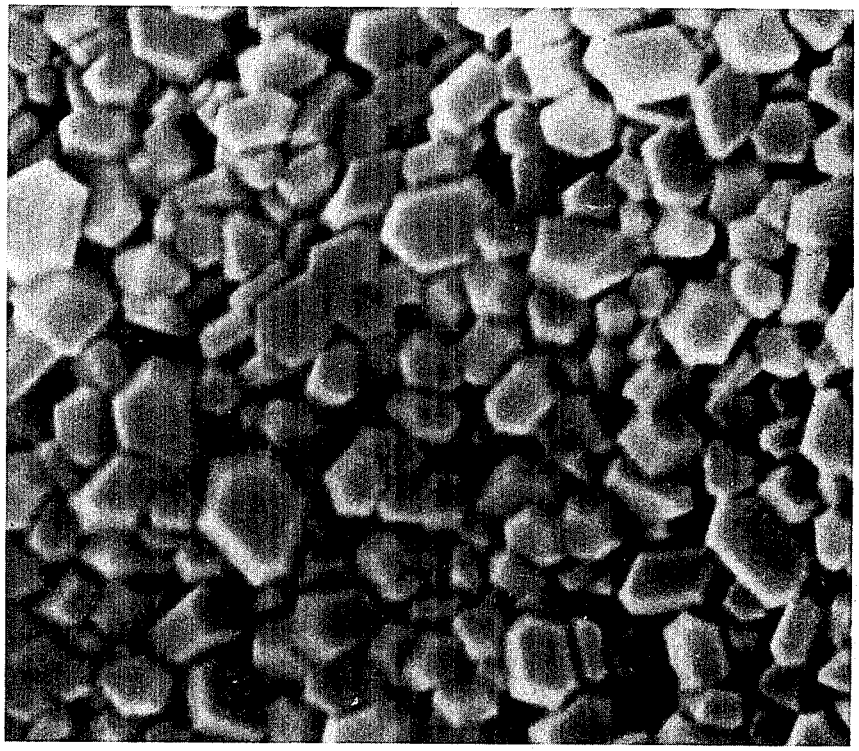
Magnified 30,000:1

FINELY DIVIDED ISOMETRIC HEXAFERRITE PIGMENTS WITH A W-STRUCTURE, PROCESSES FOR THEIR PREPARATION AND THEIR USE

The present invention relates to finely divided magnetic hexaferrite pigments having the composition $$E_xM_m(I)M_n(II)Fe_{18-(m+n)}O_{27-y}D_y$$

wherein
E is one or more elements from the group of alkaline earth metals, alkali metals and lanthanides or lead,
M(I) and M(II) are each one or more elements from the group of metals or semi-metals and
D is one or more elemens from the group of halogens and chalcogens and
$0.8 \leq x \leq 1.2$,
$1.0 \leq m \leq 3.0$,
$0 \leq n \leq 8.0$,
$0 \leq y \leq 5.0$ and
n is the same as y when $n > 0$
with the proviso that electroneutrality is preserved.

The invention also relates to processes for the preparation of these hexaferrite pigments and to their use in magnetic recording carriers.

BACKGROUND OF THE INVENTION

Hexaferrites have coercive field strengths of the degree required for high density magnetic storage (45 to 120 $KA^{-1}$). In their chemical resistance they are superior to metal pigments and in their thermostability they are superior to iron oxide pigments doped with $CrO_2$ and Co. Hexaferrite pigments having a magnetoplumbite (M—) structure have already been proposed for use in high density magnetic recording carriers. In their pure form as finely divided pigments, they have coercive field strengths much too high (160 to 480 $KAm^{-1}$) for recording purposes. They are usually doped with Co and Ti ions for obtaining suitable coercive field strengths. Such doping reduces both the saturation magnetisation ($M_s$) and the thermal resistance as well as rendering the product less economical due to the use of cobalt which is expensive. Numerous hexaferrites with different structures are known (e.g. W, X, Y, Z, U) which have not found any application in magnetic recording media on account of their insufficient saturation magnetisation (B. F. Haberey, Fachdokumentation des Fortschritts 1971, special issue, Elektro-Anzeiger, publishers W. Girardet, Essen). See also Ferromagnetic Materials, Vol. 3, (1982), p. 395 ff. Ed. E. P. Wohlfarth, North-Holland Publishing Co., Amsterdam. W-hexaferrite would be of interest on account of its high saturation magnetisation but so far only the powders prepared by sintering followed by size reduction have been proposed, (JA-Appl. 84-106, 107; C.A. 1984, 101; 221237; JA 84-174, 530 C.A. 1984, 102-54951; JA 84-174, 531, C.A. 1984, 102-38462) and these do not fulfill the criteria of a magnetic pigment. If pigments are to be suitable for use as magnetic recording materials, they must fulfil the condition of being finely divided, with diameters from 0.5 μm to 0.05 μm, and of having a narrow particle size distribution.

Uniformly fine particles in the necessary pigment size range below 0.5 μm cannot be obtained by the subsequent size reduction of ceramic frits. No pigment-like W-hexaferrites have hitherto been known. Hexagonal M-ferrites (magnetoplumbite) are prepared from metal borate melts (U.S. Pat. No. 3,716,630 and U.S. Pat. No. 4,493,874). By this method it has been possible to produce materials suitable for magnetic recording purposes but these materials still have insufficient saturation magnetisation and a disadvantageous change in coercivity with increasing temperature. Another disadvantage of M-ferrites is the necessity of using cobalt for adjusting the coercivity to within a suitable range.

The known processes for the preparation of finely divided hexaferrites for signal storage are directed to the formation of anisometric, in particular platelet shaped particles, from which advantageous magnetic properties are expected if the platelet form is pronounced.

In the platelet shaped hexagonal ferrites described, the magnetically light direction is perpendicular to the plane of the platelets, with the result that for vertical recording the maximum storage density is limited by the diameter of the platelets. Furthermore, with conventional methods of preparation of magnetic storage media, only moderate orientation in the preferential magnetic direction can be achieved due to the rheological characteristics of dispersions of platelet shaped pigments.

It is an object of the present invention to provide hexagonal ferrites suitable for magnetic recording which are superior in their properties to the hexagonal ferrites known in the art and can be obtaind economically.

BRIEF DESCRIPTION OF THE INVENTION

These requirements are fulfilled to a particularly high degree by finely divided magnetic hexaferrite pigments with a W-structure having the general composition $$E_xM_m(I)M_n(II)Fe_{18-(m+n)}O_{27-y}D_y$$

wherein
E is one or more elements from the group of alkaline earth metals, alkali metals and lanthanides or lead,
M(I) and M(II) are each one or more elements from the group of metals or semi-metals and
D is one or more elements from the group of halogens or chalcogens and
$0.8 \leq x \leq 1.2$,
$1.0 \leq m \leq 3.0$,
$0 \leq n \leq 8.0$,
$0 \leq y \leq 5.0$ and
n is the same as y when $n > 0$ with the proviso that electroneutrality is preserved and wherein the hexaferrite pigments have almost the same dimensions in all directions in space.

These hexaferrite pigments according to the invention are distinguished by being able to have a high packing density in the carrier material and by their possibility of being magnetically orientated in any desired direction in space. They are thus eminently suitable for use in isotropic and vertical magnetic recording processes. In the pigments according to the invention, the discrepancy between form anisotropy and crystal anisotropy is eliminated since form anisotropy disappears.

Such well crystallised, finely divided hexaferrites have not hitherto been known.

DETAILED DESCRIPTION

Hexaferrite pigments in which the ratio of diameter to thickness of the particles is in the range of 0.6 to 1.5, especially 0.8 to 1.3, are particularly preferred. The crystal size is within the usual range for magnetic pigments.

Hexaferrite pigments which have a saturation magnetisation ($M_s$) of 80 $nT/m^3g$ or more are particularly preferred. The finely divided magnetic hexaferrite pigments according to the invention thus have a markedly higher saturation magnetisation than the finely divided hexaferrite pigments hitherto known.

The present invention also relates to a process for the preparation of finely divided isometric magnetic W-hexaferrite pigments in which a mixture of metal oxides, hydroxides, hydroxyoxides, carbonates and/or nitrates corresponding to the composition of the W-hexaferrite pigments together with boron oxide, boric acid and/or metal borates and/or $SiO_2$ is melted at temperatures of from 1100° to 1450° C., most preferably from 1250° to 1350° C., and the melt obtained is chilled to a temperature of $\leq 600°$ C., and then tempered at temperatures of from 1000° to 1400° C. for a period of 1 second to 2 hours.

An embodiment of the invention in which chilling is carried out in a cooling medium, preferably a liquid, aqueous medium or liquid gas, is particularly preferred.

$NaFeO_2$, $V_2O_5$, $Bi_2O_3$, PbO and/or $MoO_3$ are suitable additional constituents of the flux.

An embodiment of the process according to the invention in which 1 to 10 atoms % of metal fluorides and/or metal peroxides, based on the composition of the W-hexaferrite pigments, are added to the mixture is particularly preferred. The metal fluorides and peroxides used in this embodiment are advantageously fluorides and peroxides of barium.

Metal fluorides and peroxides increase the saturation magnetisation of the finely divided hexaferrites and have an advantageous effect on the processing characteristics.

The metal components are vigorously mixed and melted in a chamber furnace, gas reverberatory furnace, annular hearth furnace, induction furnace or light arc furnace. Melting is carried out at temperatures of from 1100° to 1450° C. applied for periods from 1 minute to 15 hours, preferably from 10 minutes to 6 hours. A homogeneous melt may also be obtained at lower temperatures with intermediate periods of cooling, homogenization and remelting. The crucible material used may be platinum, zirconium, nickel, zirconium dioxide (stabilized with $Y_2O_3$ or CaO), MgO, SiC, BN or $SnO_2$, preferably zirconium dioxide, Nickel or BN.

The melt is chilled as rapidly as possible from the melting temperature to room temperature. The cooled product is then subjected to a further heat treatment in a chamber furnace at temperatures of from 1000° to 1400° C. for periods of 1 second to 2 hours. The product then obtained is cooled and subjected to an acid treatment in which the vitreous matrix is treated with a weak acid, preferably acetic acid, tartaric acid or citric acid.

The outstanding characteristics of this process are its simplicity and flexibility. The magnetic hexaferrites prepared by the process according to the invention have very good saturation magnetisation values. The process is also distinguished by being exceptionally economical.

BRIEF DESCRIPTION OF THE DRAWING

The FIGURE is a photomicrograph of the pigment particles of this invention.

The present invention also relates to the use of the hexaferrites according to the invention in magnetic recording carriers.

The following examples and comparison serve to further illustrate this invention but are not to be considered as limiting the invention.

EXAMPLE 1

A mixture of 14.69% by weight of $B_2O_3$, 44,58% by weight of $BaCO_3$, 37.63% by weight of $Fe_2O_3$ and 3.10% by weight of ZnO was melted in a platinum crucible at 1350° C. under air to form a homogeneous glass flux. The hot melt was chilled to about 300° C. on a metal support within 0.1 second. After 1 hour's tempering at 1150° C. with admission of air followed by acid treatment with dilute acetic acid (5 h), a finely divided barium hexaferrite of the formula $BaZn_2Fe_{16}O_{27}$ with a W structure was obtained. The product had the following properties:

IHc: 48 $KAm^{-1}$.
$M_s/\rho$: 97.1 $nTm^3/g$ at 1200 $KAm^{-1}$ measuring field.
Diameter ($\phi$)/thickness (D): 1.5.

Phase analysis was carried out by fine structural X-ray analysis. The diameter/thickness ratio was determined by SEM photographs (FIG. 1).

EXAMPLE 2

A mixture as described in Example 1 was treated as in Example 1 and tempered at 1150° C. for 5 minutes and then treated with acetic acid as described in Example 1.

A W-ferrite having the following properties was obtained:

IHc: 48 $KAm^{-1}$.
$M_s/\rho$: 88 $nTm^3/g$ at 1200 $KAm^{-1}$ measuring field.
$\phi/D$: 0.8.

EXAMPLE 3

A mixture of 11.91 parts of $B_2O_3$, 47.26 parts of $BaCO_3$, 36.59 parts of $Fe_2O_3$, 3.01 parts of ZnO and 1.23 parts of $SiO_2$ was treated as in Example 1. A W-ferrite having the following properties was obtained:

IHc: 60 $KAm^{-1}$.
$M_s/\rho$: 94 $nTm^3/g$ at 1200 $KAm^{-1}$ measuring field.

EXAMPLE 4

A mixture of 15.13 parts of $B_2O_3$, 35.7 parts of $BaCO_3$, 8.89 parts of $BaFe_2$, 37.58 parts of $FeO_3$ and 2.658 parts of ZnO was melted in a platinum crucible at 1350° C. under air to form a homogeneous glass flux. The hot melt was chilled to about 50° C. in 0.1 second in a roller apparatus. After the mixture had been tempered at 1150° C. for 10 minutes with admission of air and then acid treated with dilute acetic acid (5 hours), a finely divided barium hexaferrite with W-structure was obtained. This product was found to have the following properties:

IHc: 32.6 $KAm^{-1}$.
$M_s/\rho$: 90.5 $nTm^3/g$ at 1200 $KAm^{-1}$ measuring field.

EXAMPLE 5

A mixture of 15.15 parts of $B_2O_3$, 35.80 parts of $BaCO_3$, 8.72 parts of $BaO_2$, 37.65 parts of $Fe_2O_3$ and 2.66 parts of ZnO was treated as in Example 4. A finely divided Ba-hexaferrite with a W-structure having the following properties was obtained:

IHc: 36.6 $KAm^{-1}$.
$M_s/\rho$: 93.6 $nTm^3/g$ at 1200 $KAm^{-1}$ measuring field.

EXAMPLE 6

(comparison example)

A mixture of $B_2O_3$, $Fe_2O_3$ and ZnO having a composition in which the $BaF_2$ and $BaO_2$ was replaced by $BaCO_3$ was treated as in Example 4.

The finely divided barium hexaferrite with W-structure obtained had the following properties:

IHc: 36.6 KA/m.

$M_s/\rho$: 85.3 $nTm^3/g$ at 1200 KA/m measuring field.

What is claimed is:

1. Finely divided magnetic particles of hexaferrite pigments with a W-structure having the composition

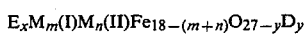

wherein

E is at least one element from the group comprising alkaline earth metals, alkali metals, lanthanides or lead, M(I) and M(II) are independently at least element from the group comprising metals or semi-metals and D is at least one element from the group of halogens and chalcogens and $0.8 \leq x \leq 1.2$, $1.0 \leq m \leq 3.0$, $0 \leq n \leq 8.0$, $0 \leq y \leq 5.0$ and n is the same as y when $n > 0$ with the proviso that electroneutrality is preserved, and wherein the hexaferrite pigment particles have substantially the same dimensions in all directions in space.

2. Finely divided magnetic hexaferrite pigments according to claim 1 wherein the ratio of diameter to thickness of the particles is in the range of 0.6 to 1.5.

3. Finely divided magnetic hexaferrite pigments according to claim 2 wherein the ratio of diameter to thickness is 0.8 to 1.3.

4. Finely divided magnetic hexaferrite pigments according to claim 1 having a saturation magnetisation $(M_s)$ of $\geq 80$ $nTm^3/g$.

5. Process for the preparation of finely divided isometric W-hexaferrite pigments according to claim 1 which comprises melting a mixture of (i) metal oxides, hydroxides, hydroxyoxides, carbonates, nitrates or mixtures thereof corresponding to the composition of the W-hexaferrite pigments together with (ii) boron oxide, boric acid, metal borates, $SiO_2$ or mixtures thereof at temperatures of from 1100° to 1450° C. and then chilling the melt obtained to $\leq 600°$ C. and then tempering the chilled melt at temperatures of from 1000° to 1400° C. for 1 second to 2 hours.

6. Process according to claim 5 wherein 1 to 10 atoms % of metal fluorides, metal peroxides or both, based on the composition of the W-hexaferrite pigments, is added to the (i)–(ii) mixture.

7. Process according to claim 6 the metal fluorides and peroxides are fluorides and peroxides of barium.

8. Process according to claim 5 wherein chilling is carried out in a cooling agent.

9. Process according to claim 5 wherein after tempering the reaction product is treated with a weak acid.

10. Process according to claim 9 wherein the weak acid is acetic acid, citric acid, oxalic acid, tartaric acid, or a mixture thereof.

11. In a composite article of manufacture for recording magnetic impulses which contains magnetic pigment particles, the improvement comprises said magnetic pigment particles being a finely divided magnetic hexaferrite pigment with a W-structure according to claim 1.

* * * * *